(12) United States Patent
Favreau-Lessard et al.

(10) Patent No.: US 12,483,633 B2
(45) Date of Patent: *Nov. 25, 2025

(54) CREATING SEGMENTS FOR DIRECTED INFORMATION USING LOCATION INFORMATION

(71) Applicant: Foursquare Labs, Inc., New York, NY (US)

(72) Inventors: Simon Favreau-Lessard, San Francisco, CA (US); Daniel Harrison, New York, NY (US); Adam Poswolsky, New York, NY (US); Jason Liszka, New York, NY (US); Robert Stewart, Brooklyn, NY (US)

(73) Assignee: Foursquare Labs, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,146

(22) Filed: Apr. 7, 2023

(65) Prior Publication Data

US 2023/0319152 A1     Oct. 5, 2023

Related U.S. Application Data

(63) Continuation of application No. 16/284,114, filed on Feb. 25, 2019, now Pat. No. 11,627,192, which is a
(Continued)

(51) Int. Cl.
*G06F 16/00*     (2019.01)
*G06F 16/9537*     (2019.01)
(Continued)

(52) U.S. Cl.
CPC .......... *H04L 67/52* (2022.05); *G06F 16/9537* (2019.01); *H04L 67/535* (2022.05); *H04W 4/021* (2013.01); *H04W 4/029* (2018.02)

(58) Field of Classification Search
CPC ... H04L 67/52; H04L 67/535; G06F 16/9537; H04W 4/021; H04W 4/029
See application file for complete search history.

(56) References Cited

U.S. PATENT DOCUMENTS 8,812,029 B1 *   8/2014   Cao ...................... H04W 4/023
                                                         455/457
9,628,573 B1 *   4/2017   Goodspeed ........... H04W 4/023
(Continued)

OTHER PUBLICATIONS

Namiot et al., "Customized Check-in Procedures", Springer-Verlag Berlin Heidelberg, LNCS 6869, pp. 160-164 (Year: 2011).

*Primary Examiner* — Alexander Khong
(74) *Attorney, Agent, or Firm* — Faegre Drinker Biddle & Reath LLP

(57) ABSTRACT

In non-limiting examples, passive information is used to verify the location of a client computing device and to create segment categories for directed information using location-based services and/or applications. In aspects, passive information is received from a client computing device. The client computing device is detected as being located at a predicted venue using the passive information. It may be determined whether directed information associated with the predicted venue has been displayed at an earlier time on a predetermined portion of the client computing device. In response to determining directed information associated with the predicted venue has been displayed on the predetermined portion of the client computing device, a statistical model may be applied to calculate a confidence score that the client computing device is located at the predicted venue. When the confidence score meets a predetermined threshold, a directed information conversion record may be stored in a data store.

20 Claims, 5 Drawing Sheets

Related U.S. Application Data continuation of application No. 14/814,290, filed on Jul. 30, 2015, now Pat. No. 10,218,798.

(51) Int. Cl.
*H04L 67/50* (2022.01)
*H04L 67/52* (2022.01)
*H04W 4/021* (2018.01)
*H04W 4/029* (2018.01)

(56) References Cited

U.S. PATENT DOCUMENTS

| | | | | |
|---|---|---|---|---|
| 2012/0005021 A1* | 1/2012 | Ratnam | ............. | G06Q 30/0256 705/14.54 |
| 2012/0213404 A1* | 8/2012 | Steiner | ............... | G06F 16/5838 382/218 |
| 2013/0066821 A1* | 3/2013 | Moore | ................. | H04L 67/306 706/46 |
| 2014/0031067 A1* | 1/2014 | Kubo | .................... | H04W 4/025 455/456.3 |
| 2014/0032325 A1* | 1/2014 | Weiss | ................. | G06Q 30/0261 705/14.58 |
| 2014/0067901 A1* | 3/2014 | Shaw | ..................... | H04L 67/52 709/201 |
| 2014/0095421 A1* | 4/2014 | Romanowski | ......... | G06Q 10/04 706/46 |
| 2014/0222570 A1* | 8/2014 | Devolites | ................ | H04W 4/02 705/14.58 |
| 2015/0193543 A1* | 7/2015 | Poliakov | ............ | G06F 16/9537 707/738 |
| 2015/0220835 A1* | 8/2015 | Wilson | .............. | G06Q 30/0269 706/46 |
| 2015/0248436 A1* | 9/2015 | Podemsky | ............. | H04L 67/54 707/724 |
| 2016/0300263 A1* | 10/2016 | Priness | ................... | H04W 4/02 |
| 2017/0272917 A1* | 9/2017 | Otis | ...................... | H04W 4/021 |

* cited by examiner

CREATING SEGMENTS FOR DIRECTED INFORMATION USING LOCATION INFORMATION

CROSS-REFERENCE TO RELATED APPLICATIONS

This application is a continuation application of U.S. patent application Ser. No. 16/284,114, filed Feb. 25, 2019, issued as U.S. Pat. No. 11,627,192, which application is a continuation of U.S. patent application Ser. No. 14/814,290, filed Jul. 30, 2015, issued as U.S. Pat. No. 10,218,798, the disclosures of which are hereby incorporated herein by reference in their entireties.

BACKGROUND

Location-based services detect location using a variety of methods. Typically, location-based services permit users to verify their locations using one or more computer systems. For example, a location-based service may receive an indication that a user is located at or near a venue from one or more computer systems. An entity may promote a listing to clients of the location-based service that are issuing queries as a proximate location to the venue. It is with respect to this general environment that aspects of the present technology disclosed herein have been contemplated.

SUMMARY

In a non-limiting example of the present disclosure passive information is used to verify the location of a client computing device and to create segment categories for directed information using location-based services and/or applications. In one aspect, passive information is received from a client computing device. The client computing device is detected as being located at a predicted venue using the passive information. It may be determined whether directed information associated with or otherwise related to the predicted venue has been displayed at an earlier time on a predetermined portion of the client computing device. In response to determining directed information associated with the predicted venue has been displayed on the predetermined portion of the client computing device, a statistical model may be applied to calculate a confidence score that the client computing device is located at the predicted venue. When the confidence score meets a predetermined threshold, a directed information conversion record may be stored in a data store.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures. As a note, the same number represents the same element or same type of element in all drawings.

DETAILED DESCRIPTION

Figure 1:
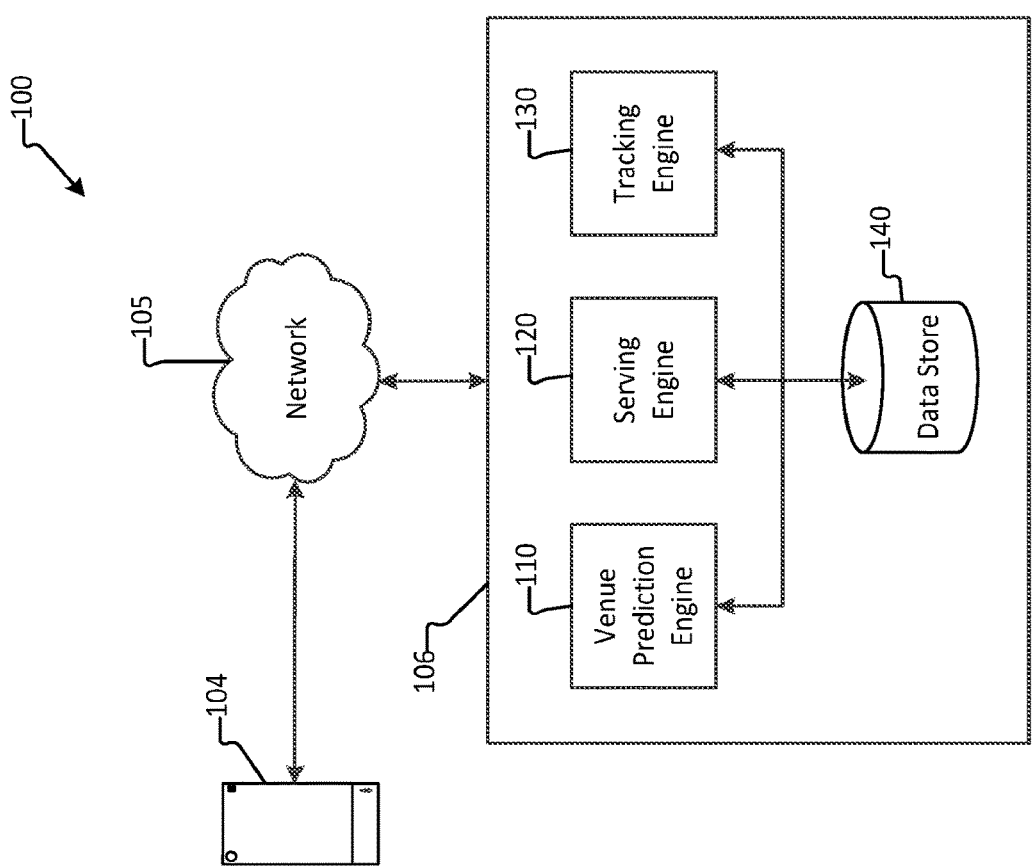
FIG. 1 illustrates an exemplary system for verifying a location of a client computing device using passive information, according to an example aspect.

In the following detailed description, references are made to the accompanying drawings that form a part hereof, and in which are shown by way of illustrations specific aspects or examples. These aspects may be combined, other aspects may be utilized, and structural changes may be made without departing from the spirit or scope of the present disclosure. Aspects may be practiced as methods, systems or devices. Accordingly, aspects may take the form of a hardware implementation, an entirely software implementation or an implementation combining software and hardware aspects. The following detailed description is therefore not to be taken in a limiting sense, and the scope of the present disclosure is defined by the appended claims and their equivalents.

Non-limiting examples of the present disclosure generally relate to using passive information to verify the location of a client computing device and to create segment categories for directed information using location-based services and/or applications. Passive information, in general, may be information that is generated or gathered without requiring input or explicit actions (e.g., without requiring user input). Passive information may be passive information related to a device location. In one example, a segment category is a category including client computing devices having particular shared characteristics. For example, a segment category may include client computing devices that have been identified as located (currently or at an earlier time) at coffee shops. Existing techniques for determining the location of a client computing device and/or creating segment categories for directed information using location-based services and/or applications depend on an explicit indication that a client computing device visited a specific location. For example, existing location-based services and/or applications may rely on a user of the location-based services and/or applications to actively check-in (e.g., perform and action) using the client computing device in order to verify the location of the user and/or the client computing device. However, relying on an explicit indication that a client computing device visited a particular location may result in the location-based services and/or applications not always identifying when a user has visited the particular location. Further, relying on an explicit indication that a client computing device visited a specific location may result in limited creation of segment categories by only including users and/or client computing devices in the segment categories based on the explicit indication. Accordingly, aspects described herein include using passive information (both independent from and/or in addition to active location information) to verify the location of a client computing device and to create segment categories for directed information using location-based services and/or applications. In turn, the systems described herein may determine with high accuracy when a client computing device is at a particular location even in the absence of an explicit indication and expand existing segment categories by including users and/or client computing devices in segment categories in the absence of an explicit indication. However, in further embodiments, active information may be used instead of or in addition to the passive information. Active information is information generated when a specific action is performed. Data generated based upon a check-in action or other information provided by the application (e.g., a tip, a recommendation, a rating, etc.) are examples of active information. Active information may also be used to validate passive information. For example, a confidence model generated using active information may be used to verify whether passive information provided by a device indicates that the device is at a specific location. In other examples, a history of passive data may be compared to active data (e.g., a tip for a venue, a rating of a venue, etc.) generated at a later time to verify that the device was located at a specific venue. One of skill in the art will appreciate that active information may be employed with the examples disclosed herein without departing from the scope of this disclosure.

A number of technical advantages are achieved based on the present disclosure including but not limited to: verifying a location of a client computing device using passive information, creating segment categories for directed information using passive information, providing relevant and meaningful information to a client computing device, improved accuracy in venue prediction, enhanced reliability in passive venue visits including reduction in incorrect venue predictions, reduced processing load on devices during data collection and venue visits, and improved usability related to location-based applications and services, improved user experience by enhancing personalization of directed information, enhanced delivery of directed information and tracking activity subsequent to delivery of the directed information, improved reporting, among other examples.

With reference to FIG. 1, one aspect of a system 100 for verifying a location of a client computing device using passive information is illustrated. Exemplary system 100 presented is a combination of interdependent components that interact to form an integrated whole for location-based applications and services. Components of the systems may be hardware components or software implemented on and/or executed by hardware components of the system. In examples, system 100 may include any of hardware components (e.g., used to execute/run operating system (OS)), and software components (e.g., applications, application programming interfaces, modules, virtual machines, runtime libraries, etc.) running on hardware. In one example, an exemplary system 100 may provide an environment for software components to run, obey constraints set for operating, and/or make use of resources or facilities of the system 100, where components may be software (e.g., application, program, module, etc.) running on one or more processing devices. For instance, location verifying and segment category creation operations (e.g., applications, instructions, modules, etc.) may be run on a processing device such as a computer, mobile device (e.g., smartphone/phone, tablet, a wearable computing device) and/or any other electronic devices. As an example of a processing device operating environment, refer to operating environment 500 of FIG. 5. In other examples, the components of systems disclosed herein may be spread across multiple devices. For instance, input may be received at a client device (e.g., mobile phone) and information may be processed or accessed from other devices in a network such as one or more server devices used, for example, for verifying the location of a client computing device and/or creating segment categories for directed information using passive information.

As one example, the system 100 comprises a client computing device 104, a server computing device 106, a venue prediction engine 110, a serving engine 120, a tracking engine 130, and a data store 140. One of skill in the art will appreciate that the scale of systems such as system 100 may vary and may include more or fewer components than those described in FIG. 1. In a basic configuration, the client computing device 104 is a handheld computer having both input elements and output elements. The client computing device 104 may be any suitable computing device for use with the system 100 for verifying the location of the client computing device 104 using passive information. For example, the client computing device 104 may be at least one of: a mobile telephone; a smartphone; a tablet; a phablet; a smartwatch; a wearable computer; a personal computer; a desktop computer; a laptop computer; a gaming device/computer; a television; etc. This list is exemplary only and should not be considered as limiting. Any suitable client computing device 104 for use with the system 100 for verifying the location of the client computing device 104 and creating segment categories for directed information using passive information may be utilized.

In aspects, the venue prediction engine 110, the serving engine 120, the tracking engine 130, and the data store 140 may be implemented on the server computing device 106. The server computing device 106 may provide data to and receive data from the client computing device 104 through a network 105. In aspects, the venue prediction engine 110, the serving engine 120, the tracking engine 130, and the data store 140 may be implemented on more than one server computing devices. As discussed above, the server computing device 106 may provide data to and from the client computing device 104 through the network 105. The data may be communicated over any network suitable to transmit data. In some aspects, the network is a distributed network such as the Internet. In this regard, the network may include a Local Area Network (LAN), a Wide Area Network (WAN), or any other wireless and wired transmission connections. The location of the client computing device 104 may be verified using passive information and segment categories for directed information may be created using passive information by the system 100.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, laptop computers, etc.), handheld devices, multiprocessor systems, microprocessor-based or programmable consumer electronics, minicomputers, and/or mainframe computers.

In addition, the aspects and functionalities described herein may operate over distributed systems (e.g., cloud-based computing systems), where application functionality, memory, data storage and retrieval and various processing functions may be performed remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a surface onto which user interfaces and information of various types are projected. Interaction with the multitude of computing systems with which aspects of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As discussed above, the system 100 may be configured to verify the location of a client computing device using passive information. In one example, passive information includes a longitude and latitude of the client computing device 104, a speed at which the client computing device 104 is travelling, a relative movement of the client computing device 104, wireless scan data, and/or a time of day, among other examples. In aspects, wireless scan data is any signal information collected from a client computing device that is usable to identify wireless connections (e.g., access points) for a client computing device to connect with. Wireless scan data comprises at least one identifier of a wireless connection. Examples of identifiers of a wireless connection include, but are not limited to, media access control (MAC) addresses, timestamps, universally unique identifiers (UUIDs), service set identifiers (SSIDs), frequency information, signal strength information, accuracy information, device information, geographical information, Wi-Fi information, Bluetooth, infrared, and/or beacon information, among other examples.

In aspects, the venue prediction engine 110 may receive the passive information from the client computing device 104 over network 105. In this regard, the venue prediction engine 110 may be configured to detect that the client computing device 104 is located at a predicted venue (e.g., location) using the passive information. In one example, a venue is a defined area for organization of people/events. A venue may comprise one or more venues, for example a building may have a plurality of units that can each be considered venues. Examples of venues include but are not limited to: places of business (e.g., stores, restaurants, and offices), homes, buildings/portions of buildings such as suites and apartments, museums, schools, theatres, event halls, airports, transportation/vehicles, and/or stadiums, among other examples.

In one aspect, the venue prediction engine 110 may apply a machine-learning process to determine the likelihood that the client computing device 104 is located at the predicted venue by evaluating the passive information and data (e.g. indexes) maintained by a data mapping structure. Alternatively, active information may be used in place of or in addition to the passive information. In another aspect, the venue prediction engine 110 may detect that the client computing device 104 is located at a predicted venue based on a ranking of candidate venues. For example, the venue prediction engine 110 may employ processes or models to select predicted venues according to a ranking determined by a statistical model (e.g., a probabilistic classifier). The statistical model may calculate a confidence score that the client computing device 104 is located at a predicted venue and rank the predicted venues based on the calculated confidence scores. The statistical model may be any model operable to calculate a confidence score that a client computing device 104 is located at a predicted venue and rank the predicted venues. For example, the statistical model may include linear regression models, Bayes models, decision trees, random forests, etc.

In one aspect, two different statistical models may be used. For example, a first model may be used to order, or rank, the candidate venues and a second model may be used to compute a confidence value for the candidate venues. For example, a ranking model may be used to order all candidate venues. A confidence model may then be employed on the best candidate, determined by the ranking model, to generate a confidence value for the best candidate. The ranking model and the confidence model may be tuned independently based upon their performed tasks. For example, the ranking model may be optimized for ordering a list of venues. One of skill in the art will appreciate that any number of models may be employed with the aspects disclosed herein without departing from the scope of this disclosure.

In further embodiments, the venue prediction engine 110 may information from a third party application. The information received by third party applications may be validated by the venue prediction engine 110 using passive and/or active data. The third party application generating the data may be located on the same device generating the passive data or on a separate device. For example, location information (e.g., latitude, longitude, etc.) may be received from a third party application. The venue prediction engine 110 may determine a location using passive or active information as discussed above and compare the determined location to the location data received from the third party application. This provides the ability to verify the accuracy of information received from other applications or devices. In still further embodiments, the venue prediction engine 110 may use the information received from the third party with passive and/or active data to determine whether a device is located at a particular venue.

In aspects, the serving engine 120 may be configured to deliver directed information to a location-based application or service on the client computing device 104. For example, a location-based application or service associated with the client computing device may receive query parameters to search for a particular venue. The location-based application or service may provide one or more search results including one or more venues. In this regard, the serving engine 120 may select and/or display (or cause to be displayed on client computing device 104) directed information associated with the one or more venues provided in the search results on the client computing device 104. Alternatively or additionally, the serving engine may select and display directed information that is related to the one or more venues. For example, if a venue is of a specific type, such as a restaurant, the directed information selected by the serving engine may be related to restaurants rather than directly associated with venue itself. In one example, directed information may be information that is targeted to a specific device (or a user associated with a specific device) such as the client computing device 104 to incite an action in response to receiving the directed information. Directed information may be content (e.g., text, audio, and/or video content), metadata, instructions to perform an action, tactile feedback, or any other form of information capable of being transmitted and/or displayed by a device. The action may include an explicit action such as clicking on the directed information and/or performing a check-in, and/or a passive action such as a visit to a venue associated with or otherwise identified by the directed information, which will be discussed in more detail below relative to the tracking engine 130. The directed information may include information related to a venue associated with the directed information. For example, the directed information may include venue identifiers such as name and/or nickname, wireless scan data associated with the venue, contact descriptions and/or informational data such as menus, hours of operation, contact information, statistical data, reviews, etc.

In addition to selecting and displaying (or causing to be displayed) directed information associated with or related to the one or more venues provided in the search results on the client computing device 104, the serving engine 120 may be configured to store a directed information impression record in the data store 140. In one example, data store 140 may be part of and/or located at the server computing device 106. In another example, data store 140 may be a separate datastore and/or may be located separate from the server computing device 106. It is appreciated that although only one server computing device 106 is illustrated in FIG. 1, the system 100 may include a plurality of server computing devices 106 with a plurality of data stores 140. In some cases, the server computing device 106 and/or the system 100 may include a plurality of data stores 140.

In one example, the directed information impression record may include the directed information, a venue associated with or related to the directed information, a client computing device identifier, and/or a timestamp indicating the time when the directed information is displayed on the client computing device (e.g., an impression record timestamp). In examples, the directed information impression record may be created when the directed information is provided to the device. The impression record may be subsequently updated based upon the time that the directed information was actually displayed on the device's display. The client computing device identify may include any identifier sufficient to identifier the client computing device 104 such as an IP address, a device identifier, a user profile associated with the device, a user identifier, a directed information identifier, third party generated identifiers, etc. In this regard, when the serving engine 120 displays directed information associated with a venue on the client computing device 104, a directed information impression record is created and stored in the data store 140 to capture the directed information and venue associated with the directed information, the client computing device on which the information is displayed, and the time of displaying the directed information associated with the venue.

In aspects, after the directed information is displayed on the client computing device 104, the tracking engine 130 may determine whether the directed information is displayed on a predetermined portion of the client computing device 104. For example, the predetermined portion of the client computing device 104 may indicate that the directed information is viewable on the client computing device 104. In one case, the directed information may be displayed on the predetermined portion of the client computing device 104 when the directed information is scrolled into view. The tracking engine 130 may determine whether the directed information is displayed on a predetermined portion of the client computing device 104 by receiving a message from the client computing device 104 when the directed information becomes viewable (e.g., scrolls into view or otherwise displayed on a screen). In alternate examples, the directed information may be provided audibly or physically (e.g., via a haptic interface). In this regard, when the tracking engine 130 receives the message from the client computing device 104 indicating the directed information is displayed on the predetermined portion of the client computing device 104, the tracking engine 130 may determine whether an action has been performed in response to displaying the directed information on the predetermined portion of the client computing device 104.

As discussed above, an action may include an explicit action such as receiving a selection of the directed information and/or performing a check-in, and/or a passive action such as a visit to a venue associated with the directed information. In one example, the tracking engine 130 may determine that the directed information is clicked on by receiving a message from the client computing device 104 indicating a selection of the directed information has occurred. In another example, the tracking engine 130 may determine that a check-in has occurred by receiving a notification from an application (not illustrated) that a check-in has occurred. An explicit check-in may occur when a location-based application or service received input indicating that a "check-in" should be performed. For example, a "check-in" button displayed as part of a graphical user interface may be selected. In another example, the tracking engine 130 may determine that a passive action has been performed by receiving a check-in message from the venue prediction engine 110. The check-in message may include a client computing device identifier, a timestamp, and information associated with the predicted venue (e.g., the name of the venue). In examples, a check-in may relate to an indication that a device or a user associated with a device is currently located at or was previously located at a specific geographic area, location, venue, etc.

As discussed above, the venue prediction engine 110 may detect that the client computing device 104 is located at a predicted venue (e.g., location) using the passive information. In some cases, the predicted venue may be associated with a calculated confidence score. In this regard, in one example, the venue prediction engine 110 may send a check-in message to the tracking engine 130 when the confidence score that the client computing device 104 is at the predicted venue meets or exceeds a predetermined threshold. For example, the statistical model may receive the predicted venue information from the venue prediction engine 110 and calculate a confidence score that the client computing device 104 is at the predicted venue. If the confidence score meets the predetermined threshold, the venue prediction engine 110 determines that the client computing device 104 is located at the predicted venue and that a passive action (e.g., a visit to the venue associated with the directed information) has been performed. The predetermined threshold may be indicative of the accuracy that the client computing device 104 is at the predicted venue. For example, in one case, the predetermined threshold may be 95%. That is, a confidence score of 95% or better indicates that the system 100 is at least 95% confident that the client computing device 104 is at the predicted venue. One of skill in the art will appreciate that the predetermined threshold may be set at other levels of confidence without departing from the spirit of this disclosure.

In aspects, when it is determined that an action has been performed in response to displaying the directed information on the predetermined portion of the client computing device 104, the tracking engine 130 may store a directed information conversion record in the data store 140. The directed information conversion record may include at least a timestamp of when the client computing device 104 is detected at the predicted venue and the type of action performed. In one example, when the action is a passive action, and the tracking engine 130 receives a check-in message from the venue prediction engine 110, the tracking engine 130 may compare the check-in message to the directed information impression records stored in the data store 140. For example, the tracking engine 130 may compare the client computing device identifier, the timestamp, and the information associated with the predicted venue in the check-in message with the directed information impression records stored in the data store 140 to see if a match exists. In one example, a match may exist if the client computing device identifier and predicted venue information in the check-in message matches a directed information impression record having the same client computing device identifier and predicted venue information. When a match is identified, the tracking engine 130 may determine a time difference between the timestamp in the check-in message (e.g., check-in message timestamp) and the timestamp in the directed information impression record (e.g., impression record timestamp) that matches the check-in message. When the time difference is less than a predetermined time, the tracking engine 130 may store the directed information conversion record in the data store 140. In one example, the predetermined time is seventy-two hours. In this example, if the time difference between the check-in message timestamp and the impression record timestamp is less than 72 hours, the directed information conversion record will be stored in the data store 140. The directed information conversion record may indicate to the system 100 and/or a third party entity that the directed information was viewed on the client computing device 104 and that the client computing device 104 and/or a user associated with the client computing device 104 visited the venue associated with the directed information within 72 hours of viewing the directed information. One of skill in the art will appreciate that other predetermined times may be used without departing from the spirit of this disclosure.

Figure 2:
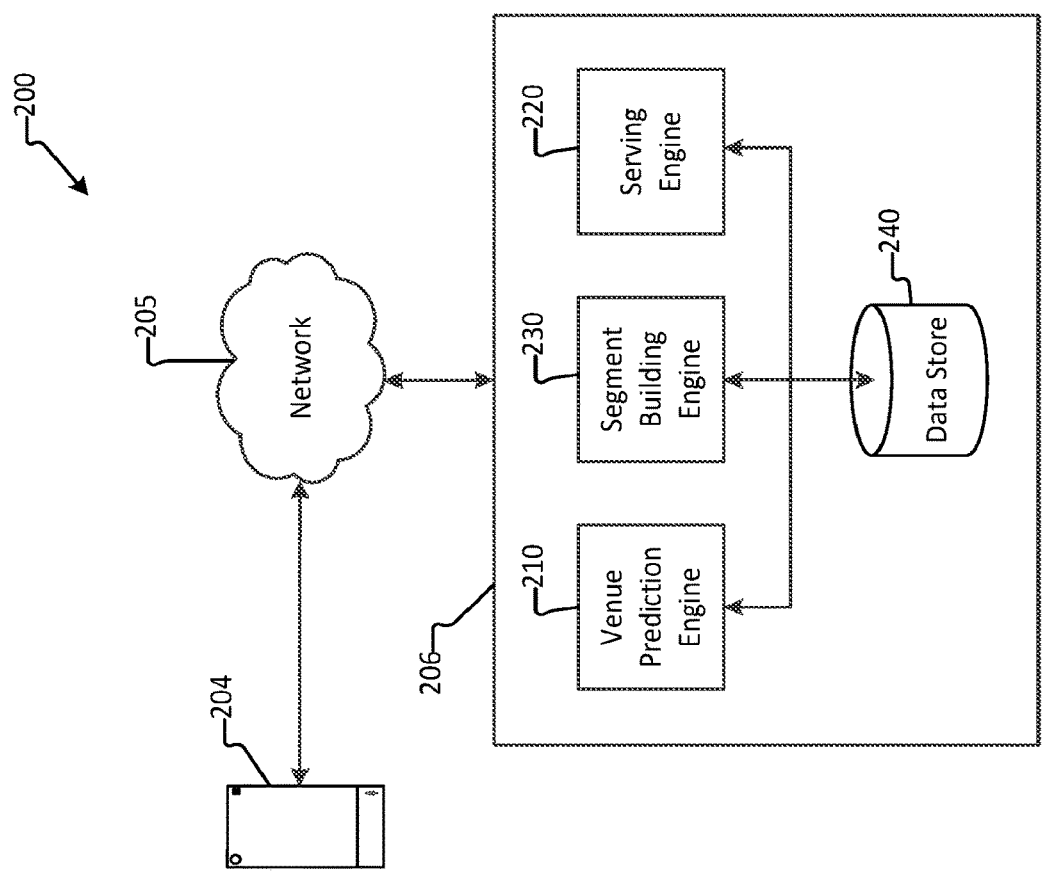
FIG. 2 illustrates an exemplary system for creating segment categories for directed information using passive information, according to an example aspect.

FIG. 2 illustrates a system 200 for creating segment categories for directed information using passive information, according to one or more aspects disclosed herein. In aspects, the system 200 may be implemented on a server computing device 206. The server computing device 206 may provide data to and received data from a client computing device 204 through a network 205. In one aspect, the network 205 is a distributed computing network, such as the Internet. In aspects, the system 200 may be implemented on more than one server computing devices. As shown in FIG. 2, the system 200 may include a client computing device 204, the server computing device 206, a venue prediction engine 210, a serving engine 220, a segment building engine 230, and a data store 240. One of skill in the art will appreciate that the scale of systems such as system 200 may vary and may include more or fewer components than those described in FIG. 2. The system 200 may be configured to create segment categories for directed information using passive information. The client computing device 204, the server computing device 206, the venue prediction engine 210, the serving engine 220, and the data store 240 may be configured similar to client computing device 104, the server computing device 106, the venue prediction engine 110, the serving engine 120, and the data store 140 described above relative to FIG. 1. In this regard, the system 200 may include some or all of the functionality described in the above aspects relative to the system 100 of FIG. 1.

As discussed above, the server computing device 204 may provide data to and receive data from the client computing device 204 through the network 205. The data may be communicated over any network suitable to transmit data. In some aspects, the network 205 is a computer network such as the internet. In this regard, the network 205 may include a Local Area Network (LAN), a Wide Area Network (WAN), the Internet, wireless and wired transmission mediums. One of skill in the art will appreciate that other types of networks may be employed with the aspects disclosed herein. In this regard, passive information may be transmitted from the client computing device 204 over the network 205 for processing by the server computing device 206. It is appreciated that the system (e.g., system 100 and system 200) various engines (e.g., the venue prediction engine 110/210, the serving engine 120/220, the tracking engine 130, the segment building engine 230, and the data store 140/240) may be located at the client computing device 204, the server computing device 206, and/or both the client computing device 204 and the server computing device 206 in any combination. For example, in one aspect, the client computing device 204 may include the venue prediction engine 210 and the serving engine 220 and the server computing device 206 may include the segment building engine 230 and the data store 240 in one configuration. This is exemplary only and should not be considered as limiting. Any suitable combination of dynamic system engines at the client computing device 204 and the server computing device 206 may be utilized.

Similar to the venue prediction engine 110 described above relative to FIG. 1, the venue prediction engine 210 may receive the passive information from the client computing device 204 over network 205. In this regard, the venue prediction engine 210 may be configured to detect that the client computing device 204 is located at a predicted venue (e.g., location) using the passive information. In examples, the venue prediction engine 210 may be configured to create a venue visit record and store the venue visit record in the data store 240 in response to detecting that the client computing device 204 is located at the predicted venue. For example, when the venue prediction engine 210 detects that the client computing device 204 is located at a predicted venue using the passive information, the venue prediction engine 210 may create the venue visit record and store the venue visit record in the data store 240. In one example, the venue visit record may include a client computing device identifier, a venue visit timestamp, the predicted venue, a type of venue, and the like. The venue visit timestamp may indicate the time at which the client computing device is detected at the predicted venue. The type of venue may include a category describing the predicted venue. For example, if the predicted venue is Local Java, the type of venue may be a coffee shop. In another example, if the predicted venue is New York Pizza, the type of venue may be a restaurant. In further examples, if a venue is part of a chain, the type of venue may be identified as a chain and used to target other venues in the same chain or other types of chain restaurants.

In some aspects, the venue prediction engine 210 receives passive information from the client computing device 204 whenever the client computing device 204 is powered on. For example, the venue prediction computing 210 may receive passive information from the client computing device 204 even when the location-based service or application is not active and/or utilized on the client computing device 204. In this regard, the venue prediction engine 210 may detect that the client computing device 204 is located at a plurality of predicted venues over a given time period. As such, the venue prediction engine 210 may create a plurality of venue visit records and store the plurality of venue visit records in the data store 240. Accordingly, the data store 240 may include a plurality of venue visit records.

In still further examples, non-passive data may be received by the venue prediction engine. For example, data may be received directly from a client computing device. An application executing on the client computing device may provide information indicating that the client computing device is at a specific location (e.g., check-in information, status updates, etc.). The venue prediction engine 210 may also receive indirect information from third party applications or networks.

As discussed above, the system 200 may be configured to create segment categories for directed information using passive information. In this regard, the segment building engine 230 may be configured to aggregate the plurality of venue visit records stored in the data store 240. In one example, the plurality of venue visit records stored in the data store 240 may be aggregated by the client computing device identifier, the type of venue, and the venue visit timestamp. In one case, the segment building engine 230 may create segment categories using the aggregated venue visit records. For example, a segment category may be created based on the type of venue. In this example, the segment category may include the client computing device identifiers that were detected at predicted venues that are categorized within the type of venue for which the segment category is created. For example, any client computing device identifiers in the venue visit records that include restaurant as a type of venue may be put in a segment category such as "Eating Out Goers." Other types of venue information may also be used when creating a segment category such as, for example, venue category information, the day of the week the venue was visited, the time of the day the venue was visited, the time of the year, weather information, etc. This example of creating a segment category is exemplary only and should not be considered as limiting. Any number of segment categories may be created from the plurality of venue visit records. Further, a client computing device identifier from a single venue visit record may be included in more than one segment category. In other examples, the segment building engine 230 may expand an already existing segment category by adding client computing device identifiers to the already existing segment category. For example, the plurality of venue visit records stored in the data store 240 may be aggregated every day. In this regard, each time the plurality of venue visit records stored in the data store 240 is aggregated, any number of client computing device identifiers may be added to already existing segment categories. One skilled in the art would recognize that new and/or additional venue visit records may be created and stored by the venue prediction engine 210 in the data store 240 on a continual basis. One skilled in the art would also recognize that the plurality of venue visit records stored in the data store 240 may be aggregated any number of times over any period of time such as once a day, twice a day, once a week, once a month, and the like.

In some cases, the segment category may be created based on whether the client computing device identifier meets a predetermined condition. In one example, the predetermined condition may be a number of times a client computing device identifier is detected at a predicted venue that is categorized within the same type of venue within a predetermined time period. In this regard, a predetermined condition for creating a segment category and/or expanding an already existing segment category may include a required number of times the client computing device identifier is detected at a type of predicted venue within a predetermined time period. For example, a client computing device identifier that is detected at a gym three or more times within 90 days may be added to a segment category such as "Fitness Goer." This is exemplary only and should not be considered as limiting. Any suitable conditions may be implemented for creating and/or expanding segment categories. In other examples, other conditions may be used for the creation of segment categories. For example, a segment category may be created based on the number times the device has visited a venue over a certain time period based upon a confidence value. In such an example, some segments may cover broad categories but have low confidence values while other segments may have high confidence values with narrower coverage. In still other examples, conditions can be used in the creation process. For example, the time of day a device was located at a venue, day of the week, weather, information about a user associated with the device, etc.

In some aspects, the venue prediction engine 210 may detect that the client computing device 204 is located at a plurality of predicted venues over a given time period using explicit check-in data, as described above relative to FIG. 1. As such, the venue prediction engine 210 may create a plurality of venue visit records and store the plurality of venue visit records in the data store 240. In this regard, the data store 240 may include venue visit records including both active information (e.g., explicit check-in data) and venue visit data generated using passive information. As discussed earlier, the active information may be used to validate visit data generated based on passive data. The segment building engine 230 may aggregate the plurality of venue visit records stored in the data store 240 including both explicit check-in data and venue visit data from using passive information. As such, the segment building engine 230 may create and/or expand segment categories using both explicit check-in data and venue visit data from using passive information.

In aspects, the segment categories may be created for directed information. For example, the segment categories may be provided to a third party entity. The third party entity may use the segment categories to provide directed information to the client computing device 204. In this regard, the serving engine 220 may be configured to deliver directed information to the client computing device 204. As discussed above relative to FIG. 1, the directed information may include venue identifiers such as name and nicknames, wireless scan data associated with the venue, contact descriptions and informational data such as menus, hours of operation, contact information, statistical data, reviews, etc. In this regard, the serving engine 220 may receive the segment categories and send directed information to the client computing devices 204 by utilizing the client computing device identifiers. For example, for a particular segment category, the serving engine 220 may identify the client computing device identifiers listed in the particular segment category and send directed information associated with the particular segment category to the identified client computing devices. In one example, if the segment category is "Fitness Goers," the directed information sent to the identified client computing devices may include information such as, but not limited to, workout facilities, nutritional supplements, fitness events, non-GMO and organic food, and the like. In some cases, the serving engine 220 is located at the third party entity. In other cases, the serving engine 220 is located at the server 206.

Figure 3:
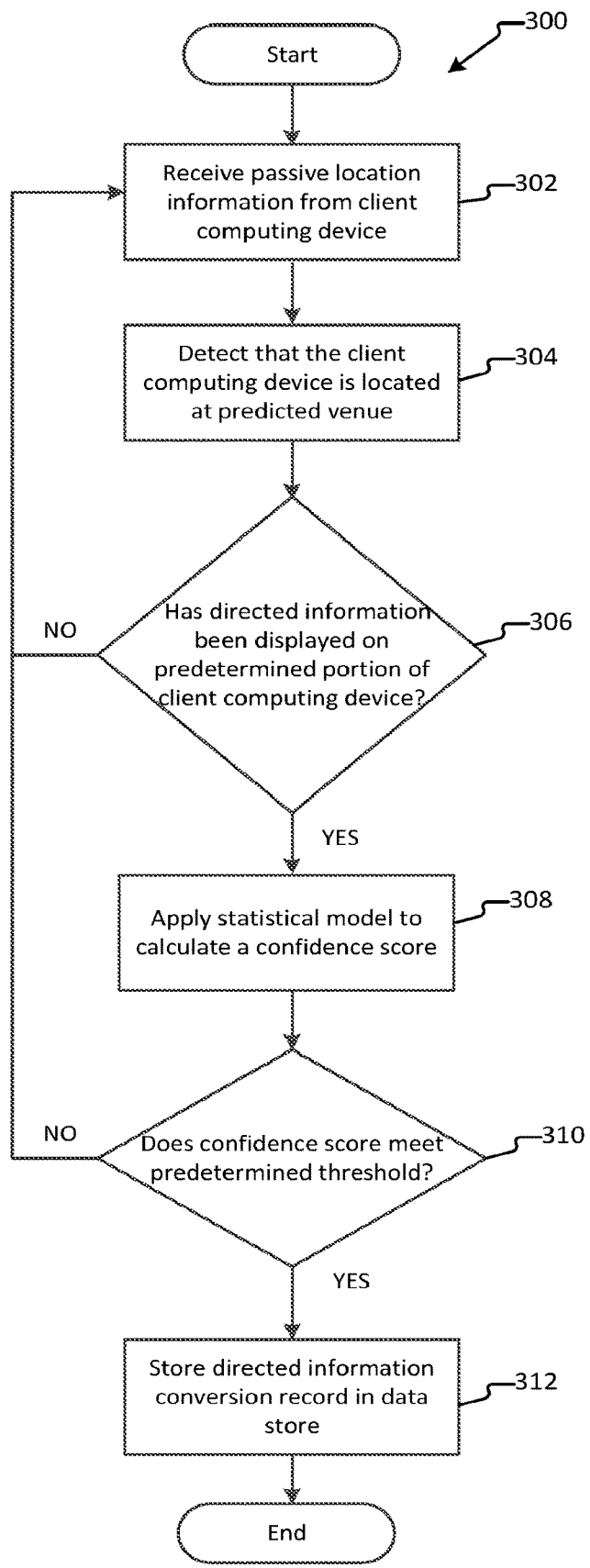
FIG. 3 illustrates an exemplary method for verifying a location of a client computing device using passive information, according to an example aspect.

FIG. 3 illustrates an exemplary method 300 for verifying a location of a client computing device using passive information, according to one or more aspects of the present disclosure. As an example, method 300 may be executed by an exemplary system such as system 100 of FIG. 1. In examples, method 300 may be executed on a device comprising at least one processor configured to store and execute operations, programs or instructions. However, method 300 is not limited to such examples. In other examples, method 300 may be performed by an application or service executing a location-based application or service. As a further example, all or a subset of the operations of the method 300 may be performed by the venue prediction engine 110, the serving engine 120, and the tracking engine 130 described in FIG. 1.

Method 300 begins at operation 302 where passive information is received from a client computing device. In one aspect, the passive information is received over a network at a venue prediction engine located at a server. In examples, passive information includes a longitude and latitude of the client computing device, a speed of the client computing device, a relative movement of the client computing device, wireless scan data, and/or a time of day, among other examples. In aspects, wireless scan data is any signal information collected from a client computing device that is usable to identify wireless connections (e.g., access points) for a client computing device to connect with. Wireless scan data comprises at least one identifier of a wireless connection. Examples of identifiers of a wireless connection include, but are not limited to, media access control (MAC) addresses, timestamps, universally unique identifiers (UUIDs), service set identifiers (SSIDs), frequency information, signal strength information, accuracy information, device information, geographical information, Wi-Fi information, Bluetooth, infrared, and/or beacon information, among other examples.

When passive information is received from the client computing device, flow proceeds to operation 304 where the client computing device is detected as being located at a predicted venue using the passive information. In one example, a venue is a defined area for organization of people/events. A venue may comprise one or more venues, for example a building may have a plurality of units that can each be considered venues. Examples of venues include but are not limited to: places of business (e.g., stores, restaurants, and offices), homes, buildings/portions of buildings such as suites and apartments, museums, schools, theatres, event halls, airports, transportation/vehicles, and stadiums, among other examples. In one aspect, a venue prediction engine may apply a machine-learning process to determine the likelihood that the client computing device is located at the predicted venue by evaluating the passive information and data (e.g. indexes) maintained by a data mapping structure. In another aspect, the venue prediction engine may detect that the client computing device is located at a predicted venue based on a ranking of candidate venues. For example, the venue prediction engine may employ processes or models to select predicted venues according to a ranking determined by a statistical model (e.g., a probabilistic classifier). The statistical model may calculate a confidence score that the client computing device is located at a predicted venue and rank the predicted venues based on the calculated confidence scores. The statistical model may be any model operable to calculate a confidence score that a client computing device is located at a predicted venue and rank the predicted venues.

Flow proceeds to operation 306 where it is determined whether directed information associated with the predicted venue has been displayed on a predetermined portion of the client computing device at an earlier time. For example, the predetermined portion of the client computing device may indicate that the directed information is viewable on the client computing device. In one case, the directed information may be displayed on the predetermined portion of the client computing device when the directed information is scrolled into view. It may be determined whether the directed information is displayed on a predetermined portion of the client computing device by receiving a message from the client computing device when the directed information becomes viewable (e.g., scrolls into view or otherwise displayed on a screen). In this regard, when a message is received from the client computing device indicating the directed information is displayed on the predetermined portion of the client computing device, it may be determined whether an action has been performed in response to displaying the directed information on the predetermined portion of the client computing device. It may be determined that a passive action has been performed by receiving a check-in message from a venue prediction engine. The check-in message may include a client computing device identifier, a timestamp, and information associated with the predicted venue (e.g., the name of the venue). In other aspects, the determination may be whether the directed information is displayed at all regardless of whether the directed information was displayed in a predetermined portion. In still other aspects, the determination may be based on whether the directed information was provided using another interface, such as audibly or using a haptic interface.

When it is determined that the directed information associated with the predicted venue has been displayed on the predetermined portion of the client computing device, flow proceeds to operation 308 where a statistical model is applied to calculate a confidence score that the client computing device is located at the predicted venue. For example, the statistical model may receive predicted venue information from the venue prediction engine and calculate a confidence score that the client computing device is at the predicted venue. If the confidence score meets the predetermined threshold, the venue prediction engine determines that the client computing device is located at the predicted venue and that a passive action (e.g., a visit to the venue associated with the directed information) has been performed. When it is determined that the directed information associated with the predicted venue has not been displayed on the predetermined portion of the client computing device, flow proceeds back to operation 302 where passive information is received from a client computing device.

Flow proceeds to operation 310 where it is determined whether the confidence score meets a predetermined threshold. The predetermined threshold may be indicative of the accuracy that the client computing device is at the predicted venue. For example, in one case, the predetermined threshold may be 95%. That is, a confidence score of 95% or better indicates at least 95% confidence that the client computing device is at the predicted venue. One of skill in the art will appreciate that the predetermined threshold may be set at other levels of confidence without departing from the spirit of this disclosure.

When it is determined that the confidence score meets the predetermined threshold, flow branches YES and proceeds to operation 312 where a directed information conversion record is stored in a data store. The directed information conversion record may include at least a timestamp of when the client computing device is detected at the predicted venue and the type of action performed. In one example, when the action is a passive action, and a check-in message is received, the check-in message may be compared to the directed information impression records stored in the data store. For example, a tracking engine may compare the client computing device identifier, the timestamp, and the information associated with the predicted venue in the check-in message with directed information impression records stored in the data store to see if a match exists. In one example, a match may exist if the client computing device identifier and predicted venue information in the check-in message matches a directed information impression record having the same client computing device identifier and predicted venue information. When a match is identified, the tracking engine may determine a time difference between the timestamp in the check-in message (e.g., check-in message timestamp) and the timestamp in the directed information impression record (e.g., impression record timestamp) that matches the check-in message. When the time difference is less than a predetermined time, the tracking engine may store the directed information conversion record in the data store. In one example, the predetermined time is seventy-two hours. In this example, if the time difference between the check-in message timestamp and the impression record timestamp is less than 72 hours, the directed information conversion record will be stored in the data store. In some cases, a report is generated based on the directed information conversion record and sent to a third party entity. The directed information conversion record and/or report may indicate to the third party entity that the directed information was viewed on the client computing device and that the venue associated with the directed information was visited within 72 hours of viewing the directed information. While a specific predetermined time period has been described herein, one of skill in the art will appreciate that other predetermined time periods may be used without departing from the spirit of this disclosure. When it is determined that the confidence score does not meet the predetermined threshold, flow proceeds back to operation 302 where passive information is received from a client computing device.

While aspects of FIG. 3 are described using passive information, one of skill in the art will appreciate that the method 300 may be performed using active information. In some examples, active information may be used instead of passive information. In other examples, active information may be used in conjunction with passive information. Furthermore, while the method 300 is described as a series of discrete operations, one of skill in the art will appreciate that more or fewer operations may be performed as part of the method 300. For example, operations described herein may be combined into a single operation or split into multiple operations. Finally, one of skill in the art will appreciate that the order of operations described may be modified without departing from the spirit and scope of this disclosure. For example, after detecting a predicted venue (operation 304) a statistical model may be applied to determine a confidence score for the predicted venue (operation 308). Upon determining that the confidence score meets a predetermined value (operation 310), a determination of whether directed information has previously been displayed on the client computing device (operation 306) may be performed. If directed information has been previously displayed, a directed information conversion record may be stored (operation 312). In other examples, still other orders of operations may be performed without departing from the scope of this disclosure.

Figure 4:
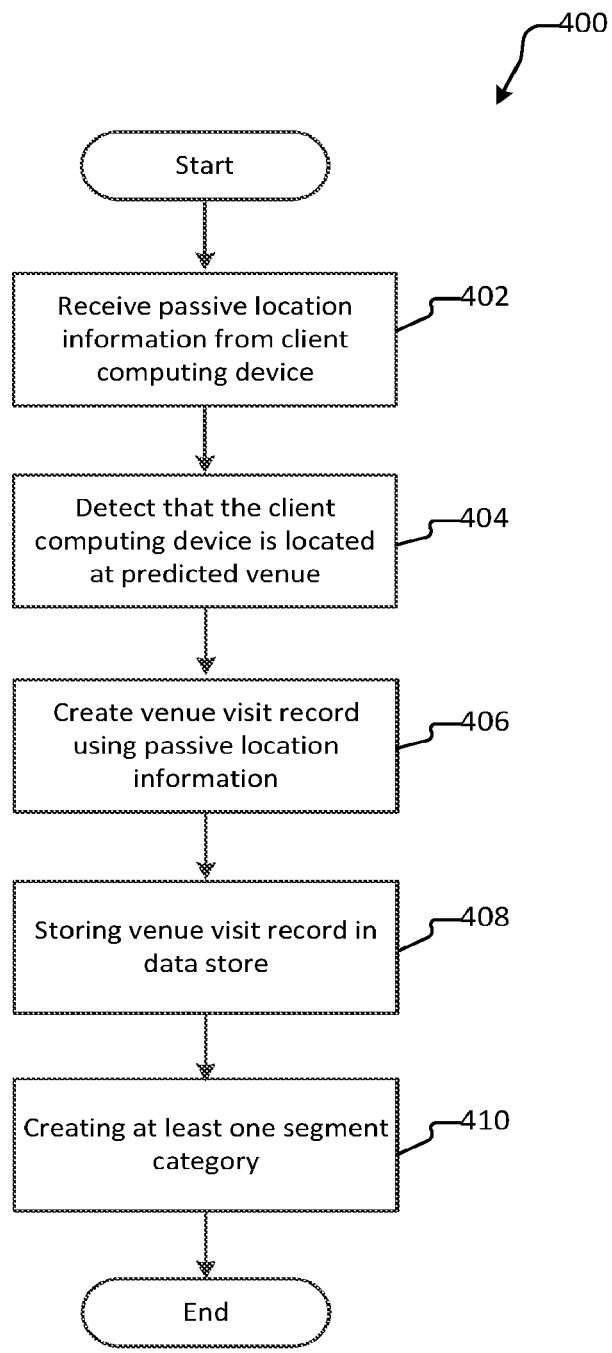
FIG. 4 illustrates an exemplary method for creating segment categories for directed information using passive information, according to an example aspect.

FIG. 4 illustrates an exemplary method 400 for creating segment categories for directed information using passive information, according to one or more aspects of the present disclosure. As an example, method 400 may be executed by an exemplary system such as system 200 of FIG. 2. In examples, method 400 may be executed on a device comprising at least one processor configured to store and execute operations, programs or instructions. However, method 400 is not limited to such examples. In other examples, method 400 may be performed by an application or service executing a location-based application or service. As a further example, all or a subset of the operations of the method 400 may be performed by the venue prediction engine 210, the serving engine 220, and the segment building engine 130 described in FIG. 2.

Method 400 begins at operation 402 where passive information is received from a client computing device. In aspects, the passive information is received over a network at a venue prediction engine located at a server. In examples, passive information includes a longitude and latitude of the client computing device, a speed of the client computing device, a relative movement of the client computing device, wireless scan data, and/or a time of day, among other examples. In aspects, wireless scan data is any signal information collected from a client computing device that is usable to identify wireless connections (e.g., access points) for a client computing device to connect with. Wireless scan data comprises at least one identifier of a wireless connection. Examples of identifiers of a wireless connection include, but are not limited to, media access control (MAC) addresses, timestamps, universally unique identifiers (UUIDs), service set identifiers (SSIDs), frequency information, signal strength information, accuracy information, device information, geographical information, Wi-Fi information, Bluetooth, infrared, and/or beacon information, among other examples.

When passive information is received from the client computing device, flow proceeds to operation 404 where the client computing device is detected as being located at a predicted venue using the passive information. In one example, a venue is a defined area for organization of people/events. A venue may comprise one or more venues, for example a building may have a plurality of units that can each be considered venues. Examples of venues include but are not limited to: places of business (e.g., stores, restaurants, and offices), homes, buildings/portions of buildings such as suites and apartments, museums, schools, theatres, event halls, airports, transportation/vehicles, and stadiums, among other examples. In one aspect, a venue prediction engine may apply a machine-learning process to determine the likelihood that the client computing device is located at the predicted venue by evaluating the passive information and data (e.g. indexes) maintained by a data mapping structure. In another aspect, the venue prediction engine may detect that the client computing device is located at a predicted venue based on a ranking of candidate venues. For example, the venue prediction engine may employ processes or models to select predicted venues according to a ranking determined by a statistical model (e.g., a probabilistic classifier). The statistical model may calculate a confidence score that the client computing device is located at a predicted venue and rank the predicted venues based on the calculated confidence scores. The statistical model may be any model operable to calculate a confidence score that a client computing device is located at a predicted venue and rank the predicted venues.

When the client computing device is detected as being located at the predicted venue, flow proceeds to operation 406 where a venue visit record is created using the passive information. In one example, the venue visit record may include a client computing device identifier, a venue visit timestamp, the predicted venue, a type of venue, and the like. The venue visit timestamp may indicate the time at which the client computing device is detected at the predicted venue. The type of venue may include a category describing the predicted venue. For example, if the predicted venue is Home Depot, the type of venue may be a home improvement service. In another example, if the predicted venue is FIT 36™, the type of venue may be a gym.

When the venue visit record is created using the passive information, flow proceeds to operation 408 where the venue visit record is stored in the data store. In examples, the data store may include a plurality of venue visit records. In some aspects, passive information may be received from the client computing device whenever the client computing device is powered on. For example, passive information may be received from the client computing device even when the location-based service or application is not active and/or utilized on the client computing device. As such, a plurality of venue visit records may be stored in the data store. Accordingly, the data store may include a plurality of venue visit records. In one example, venue visit records including both explicit check-in data and venue visit data from using passive information may be stored in the data store.

Flow proceeds to operation 410 where at least one segment category is created using the plurality of venue visit records stored in the data store. In one example, the at least one segment category is created by aggregating the plurality of venue visit records stored in the data store. In one example, the plurality of venue visit records stored in the data store may be aggregated by a client computing device identifier, a type of venue, and a venue visit timestamp. In one case, the segment building engine may create segment categories using the aggregated venue visit records. For example, a segment category may be created based on the type of venue. In this example, the segment category may include the client computing device identifiers that were detected at predicted venues that are categorized within the type of venue for which the segment category is created. For example, any client computing device identifiers in the venue visit records that include restaurant as a type of venue may be put in a segment category such as "Eating Out Goers". This example of creating a segment category is exemplary only and should not be considered as limiting. Any number of segment categories may be created from the plurality of venue visit records. Further, a client computing device identifier from a single venue visit record may be included in more than one segment category. In other examples, the segment building engine may expand an already existing segment category by adding client computing device identifiers to the already existing segment category. For example, the plurality of venue visit records stored in the data store may be aggregated every day. In this regard, each time the plurality of venue visit records stored in the data store is aggregated, any number of client computing device identifiers may be added to already existing segment categories.

In some cases, the segment category may be created based on whether the client computing device identifier meets a predetermined condition. In one example, the predetermined condition may be a number of times a client computing device identifier is detected at a predicted venue that is categorized within the same type of venue within a predetermined time period. In this regard, a predetermined condition for creating a segment category and/or expanding an already existing segment category may include a required number of times the client computing device identifier is detected at a type of predicted venue within a predetermined time period. For example, a client computing device identifier that is detected at a gym three or more times within 90 days may be added to a segment category such as "Fitness Goer". This is exemplary only and should not be considered as limiting. Any suitable conditions may be implemented for creating and/or expanding segment categories.

While aspects of FIG. 4 are described using passive information, one of skill in the art will appreciate that the method 400 may be performed using active information. In some examples, active information may be used instead of passive information. In other examples, active information may be used in conjunction with passive information. Furthermore, while the method 400 is described as a series of discrete operations, one of skill in the art will appreciate that more or fewer operations may be performed as part of the method 400. For example, operations described herein may be combined into a single operation or split into multiple operations. Finally, one of skill in the art will appreciate that the order of operations described may be modified without departing from the spirit and scope of this disclosure.

Figure 5:
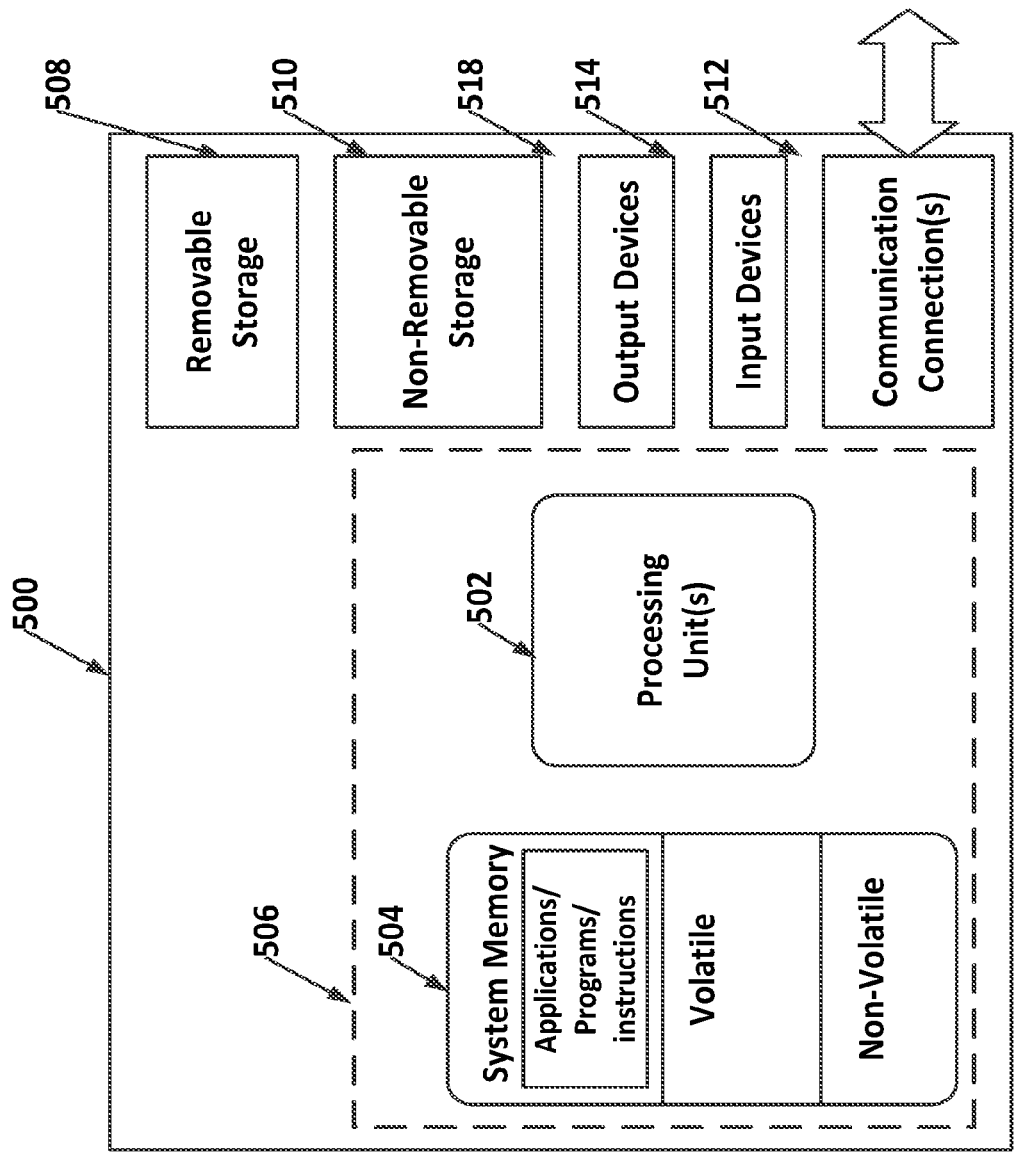
FIG. 5 illustrates one example of a suitable operating environment in which one or more of the present examples may be implemented.

FIG. 5 and the additional discussion in the present specification are intended to provide a brief general description of a suitable computing environment in which the present invention and/or portions thereof may be implemented. Although not required, the embodiments described herein may be implemented as computer-executable instructions, such as by program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

FIG. 5 illustrates one example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically includes at least one processing unit 502 and memory 504. Depending on the exact configuration and type of computing device, memory 504 (storing, among other things, location-based applications module(s), e.g., location-based check-in applications, location search applications, geocoding/reverse geocoding applications, APIs, programs etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 5 by dashed line 506. Further, environment 500 may also include storage devices (removable 508, and/or non-removable, 510) including, but not limited to, magnetic or optical disks or tape. Similarly, environment 500 may also have input device(s) 514 such as keyboard, mouse, pen, voice input, etc. and/or output device(s) 516 such as a display, speakers, printer, etc. Also included in the environment may be one or more communication connections 512, such as WiFi connections, Ethernet connections, LAN connections, WAN connections, point-to-point connections, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

As stated above, a number of program modules and data files may be stored in the system memory 504. While executing on the processing unit 502, program modules (e.g., applications, Input/Output (I/O) management, and other utilities) may perform processes including, but not limited to, one or more of the stages of the operational methods described herein such as methods 300 and 400 illustrated in FIGS. 3 and 4, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 500 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

This disclosure described some aspects of the present technology with reference to the accompanying drawings, in which only some of the possible embodiments were shown. Other aspects may, however, be embodied in many different forms and should not be construed as limited to the embodiments set forth herein. Rather, these aspects were provided so that this disclosure was thorough and complete and fully conveyed the scope of the possible embodiments to those skilled in the art.

Although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A system comprising:
    a memory; and
    at least one processor connected with the memory, configured to execute operations comprising:
    receiving information from a client computing device;
    detecting that the client computing device is located at a predicted venue using the information;
    determining whether directed information associated with the predicted venue has been displayed on a predetermined portion of the client computing device at an earlier time, wherein the predetermined portion indicates that the directed information was viewable on the client computing device;
    in response to determining the directed information associated with the predicted venue has been displayed on the predetermined portion of the client computing device at the earlier time, applying a statistical model to calculate a confidence score that the client computing device is located at the predicted venue; and
    when the confidence score meets a predetermined threshold, storing a directed information conversion record in a data store.

2. The system of claim 1, wherein determining whether directed information associated with the predicted venue has been displayed on the predetermined portion of the client computing device comprises receiving a message from the client computing device when the directed information scrolls into view on a display of the client computing device.

3. The system of claim 1, wherein the directed information conversion record includes at least a timestamp of when the client computing device is detected at the predicted venue.

4. The system of claim 1, wherein the information is passive information, and wherein the passive information comprises one or more of:
a longitude and latitude of the client computing device;
a speed of the client computing device;
a relative movement of the client computing device;
wireless scan data; and
a time of day.

5. The system of claim 1, further comprising creating a directed information impression record including at least the directed information, a venue associated with the directed information, a client computing device identifier, and an impression record timestamp.

6. The system of claim 5, wherein the impression record timestamp indicates a time of when the directed information is displayed on the predetermined portion the client computing device.

7. The system of claim 5, further comprising receiving a check-in message in response to determining the directed information associated with the predicted venue has been displayed on the predetermined portion of the client computing device.

8. The system of claim 7, wherein the directed information conversion record is stored in the data store when a time difference between the check-in message timestamp and the impression record timestamp is less than a predetermined time.

9. The system of claim 8, further comprising:
generating a report based on the directed information conversion record; and
sending the report to a third party entity.

10. A system comprising:
a memory; and
at least one processor connected with the memory, configured to execute operations comprising:
receiving passive information from a client computing device;
detecting that the client computing device is located at a predicted venue using the passive information;
in response to detecting that the client computing device is located at the predicted venue, creating a venue visit record using the passive information;
storing the venue visit record in a data store, the data store comprising a plurality of venue visit records; and
creating at least one segment category using the plurality of venue visit records stored in the data store, wherein the segment category comprises client devices having one or more shared characteristics.

11. The system of claim 10, wherein the venue visit record includes at least a client computing device identifier, a venue visit timestamp, the predicted venue, a type of venue.

12. The system of claim 11, wherein creating the at least one segment category comprises aggregating the plurality of venue visit records stored in the data store.

13. The system of claim 12, wherein the plurality of venue visit records are aggregated by the client computing device identifier, the type of venue, and the venue visit timestamp.

14. The system of claim 11, wherein the at least one segment category is created based on the type of venue.

15. The system of claim 11, further comprising expanding the created at least one segment category.

16. The system of claim 15, wherein expanding the at least one segment category comprises:
aggregating the plurality of venue visit records stored in the data store; and
determining whether the client computing device identifier meets a predetermined condition.

17. The system of claim 16, further comprising in response to determining that the client computing device identifier meets the predetermined condition, adding the client computing device identifier to the at least one segment category.

18. The system of claim 16, wherein the predetermined condition includes a number of times the client computing device identifier is detected at a type of venue within a predetermined time period.

19. The system of claim 10, wherein the at least one segment category is provided to a third party entity.

20. A computer-implemented method comprising:
receiving passive information from a client computing device;
detecting that the client computing device is located at a predicted venue using the passive information;
determining whether directed information associated with the predicted venue has been displayed on a predetermined portion of the client computing device at an earlier time, wherein the predetermined portion indicates that the directed information was viewable on the client computing device;
in response to determining the directed information associated with the predicted venue has been displayed on the predetermined portion of the client computing device at the earlier time, determining whether a passive action has been performed; and
in response to determining that the passive action has been performed, storing a directed information conversion record in a data store.

* * * * *